United States Patent
Gottmann et al.

(10) Patent No.: US 8,802,308 B2
(45) Date of Patent: Aug. 12, 2014

(54) FUEL CELL SYSTEM WITH INTERRUPTION CONTROL

(75) Inventors: Matthias Gottmann, Sunnyvale, CA (US); Arne Ballantine, Palo Alto, CA (US); James F. McElroy, Suffield, CT (US)

(73) Assignee: Bloom Energy Corporation, Sunnyvale, CA (US)

( * ) Notice: Subject to any disclaimer, the term of this patent is extended or adjusted under 35 U.S.C. 154(b) by 652 days.

(21) Appl. No.: 12/659,899

(22) Filed: Mar. 24, 2010

(65) Prior Publication Data

US 2010/0248049 A1    Sep. 30, 2010

Related U.S. Application Data

(60) Provisional application No. 61/202,683, filed on Mar. 26, 2009.

(51) Int. Cl.
*H01M 8/06* (2006.01)
*H01M 8/18* (2006.01)
*H01M 8/04* (2006.01)

(52) U.S. Cl.
CPC ........ *H01M 8/0656* (2013.01); *H01M 8/04902* (2013.01); *H01M 8/04873* (2013.01); *H01M 8/04604* (2013.01); *H01M 8/04731* (2013.01); *H01M 8/04932* (2013.01); *Y02E 60/50* (2013.01)
USPC .......................................... 429/428; 429/418

(58) Field of Classification Search
USPC ....................................................... 429/471
See application file for complete search history.

(56) References Cited

U.S. PATENT DOCUMENTS

| | | | |
|---|---|---|---|
| 4,657,829 A * | 4/1987 | McElroy et al. | 429/425 |
| 7,045,238 B2 | 5/2006 | Gottmann et al. | |
| 7,364,810 B2 | 4/2008 | Sridhar et al. | |
| 7,422,810 B2 | 9/2008 | Venkataraman et al. | |
| 7,575,822 B2 | 8/2009 | Mitlitsky et al. | |
| 7,700,210 B2 | 4/2010 | Sridhar et al. | |
| 7,713,649 B2 | 5/2010 | Hickey et al. | |
| 7,974,106 B2 | 7/2011 | Gurunathan et al. | |
| 8,232,676 B2 | 7/2012 | Gurunathan et al. | |
| 2004/0126641 A1* | 7/2004 | Pearson et al. | 429/34 |
| 2006/0078773 A1* | 4/2006 | Speranza et al. | 429/23 |
| 2007/0026931 A1 | 2/2007 | Kobayashi | |
| 2007/0196704 A1 | 8/2007 | Valensa et al. | |
| 2007/0243425 A1* | 10/2007 | Spaner | 429/12 |
| 2009/0263681 A1* | 10/2009 | Atreya et al. | 429/13 |

FOREIGN PATENT DOCUMENTS

WO    2007014127 A2    2/2007

* cited by examiner

*Primary Examiner* — Patrick Ryan
*Assistant Examiner* — Lucas J O Donnell
(74) *Attorney, Agent, or Firm* — The Marbury Law Group PLLC

(57) ABSTRACT

A method for operating a fuel cell system during an interruption includes identifying a load interruption in which an external load is partially or fully unable to draw electrical power from the fuel cell system. At least a first fuel cell column of the fuel cell system is operated in an electrolysis mode such that the first fuel cell column generates fuel during the load interruption. Power is provided to the first fuel cell column in the electrolysis mode from at least a second fuel cell column of the fuel cell system. The second fuel cell column is operating in a normal power generation operating mode.

24 Claims, 3 Drawing Sheets

FUEL CELL SYSTEM WITH INTERRUPTION CONTROL

CROSS REFERENCE TO RELATED PATENT APPLICATIONS

The present application claims benefit of U.S. provisional application No. 61/202,683, filed Mar. 26, 2009, which is incorporated herein by reference in its entirety.

FIELD

The subject of the disclosure relates generally to a fuel cell system with load interruption control. More specifically, the disclosure relates to a system, method, and computer-readable medium for maintaining fuel cell system temperature and operation during a load outage.

BACKGROUND

A fuel cell system can refer to a configuration of one or more fuel cells configured to produce a direct current (DC) signal. The individual fuel cells can be arranged in one or more fuel cell columns or stacks, such as solid oxide fuel cell columns. A fuel cell column can refer to a plurality of individual fuel cells arranged in one or more fuel cell stacks which are electrically connected in series. The number of individual fuel cells which make up a given fuel cell system can depend on the amount of electrical power which the given fuel cell system is intended to generate. Alternatively, a fuel cell system may include any other configuration of individual fuel cells. Fuel cell systems can generate electricity for provision to a grid, a building, an appliance, a lighting unit, a tool, a temperature control unit, a security system, a computing unit, etc. The electricity can be provided as DC signals or as alternating current (AC) signals via a DC/AC converter.

SUMMARY

An illustrative method for operating a fuel cell system during an interruption is provided. The method includes identifying a load interruption in which an external load is partially or fully unable to draw electrical power from the fuel cell system. At least a first fuel cell column of the fuel cell system is operated in an electrolysis mode such that the first fuel cell column generates fuel during the load interruption. Power is provided to the first fuel cell column in the electrolysis mode from at least a second fuel cell column of the fuel cell system. The second fuel cell column is operating in a normal power generation operating mode.

An illustrative fuel cell system includes a plurality of fuel cell columns and a power control system in communication with the plurality of fuel cell columns. The power control system is configured to identify a load interruption in which an external load is partially or fully unable to draw electrical power from the fuel cell system. The power control system is also configured to operate at least a first fuel cell column of the plurality of fuel cell columns of the fuel cell system in an electrolysis mode such that the first fuel cell column generates fuel during the load interruption. The power control system is further configured to provide power to the first fuel cell column operating in the electrolysis mode from at least a second fuel cell column of the plurality of fuel cell columns of the fuel cell system, where the second fuel cell column operates in a normal power generation operating mode.

An illustrative tangible computer-readable medium is also provided. The tangible computer-readable medium has computer-executable instructions stored thereon which, upon execution, cause a power control system of a fuel cell system to identify a load interruption in which an external load is partially or fully unable to draw electrical power from the fuel cell system. The power control system is also caused to operate at least a first fuel cell column of the fuel cell system in an electrolysis mode such that the first fuel cell column generates fuel during the load interruption. The power control system is further caused to provide power to the first fuel cell column operating in the electrolysis mode from at least a second fuel cell column of the fuel cell system, where the second fuel cell column operates in a normal power generation operating mode.

Another illustrative method for operating a fuel cell system during a fuel supply interruption is provided. The method includes identifying a fuel interruption in which an external fuel source is partially or fully unable to provide external fuel to the fuel cell system. Stored fuel is provided to at least a first fuel cell column of the fuel cell system such that the first fuel cell column operates in a normal power generation operating mode. At least a second fuel cell column of the fuel cell system is operated in an electrolysis mode such that the second fuel cell column generates fuel during the fuel interruption. Power is provided to the second fuel cell column operating in the electrolysis mode from at least the first fuel cell column operating in the normal power generation operating mode.

Other principal features and advantages will become apparent to those skilled in the art upon review of the following drawings, the detailed description, and the appended claims.

BRIEF DESCRIPTION OF THE DRAWINGS

Illustrative embodiments will hereafter be described with reference to the accompanying drawings.

DETAILED DESCRIPTION

A fuel cell system can be used to provide electricity to a load such as an electrical grid, a building, etc. In the event of a load interruption such as a complete or partial grid interruption or disturbance, the power output from the fuel cell system may be drastically reduced. Such a reduction in the power output can cause a rapid drop in temperature of the fuel cell system. The inventors have perceived that the rapid drop in temperature can cause damage to the individual fuel cells. For example, the temperature drop may damage a ceramic electrolyte, glass ceramic seals, and/or any other ceramic or temperature sensitive components of the fuel cell system. As such, in the event of a load interruption, the inventors have perceived a system in which at least a portion of the fuel cells in a fuel cell system are converted to operate in an electrolysis mode such that the rapid drop in temperature can be avoided.

Figure 1:
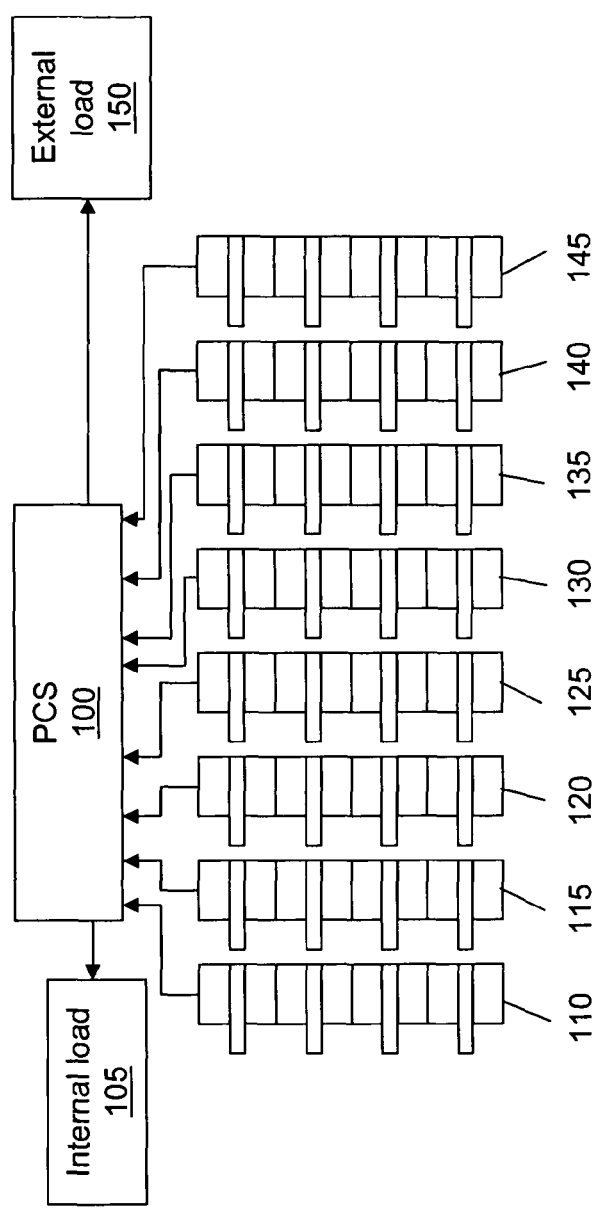
FIG. 1 is a block diagram illustrating a fuel cell system having load interruption control in accordance with an illustrative embodiment.

FIG. 1 is a block diagram illustrating a fuel cell system having load interruption control in accordance with an illustrative embodiment. As illustrated in FIG. 1, the fuel cell system is in a normal operating state (i.e., each column is operating the power generation (i.e., fuel cell) mode. The fuel cell system includes a power control system (PCS) 100, an internal load 105, a first fuel cell column 110, a second fuel cell column 115, a third fuel cell column 120, a fourth fuel cell column 125, a fifth fuel cell column 130, a sixth fuel cell column 135, a seventh fuel cell column 140, and an eight fuel cell column 145. Each of fuel cell columns 110-145 includes a plurality of individual fuel cells. For example, the individual fuel cells may be arranged in eight stacks separated by fuel manifolds as described in U.S. patent application Ser. No. 11/276,717 (published as U.S. Patent Application Publication No. 2006/0204827), the entire disclosure of which is incorporated herein by reference. In alternative embodiments, the fuel cell system may include additional, fewer, and/or different components. For example, the fuel cell system may include additional or fewer fuel cell columns. In the normal operating state, the fuel cell system can be utilized to provide electricity to an external load 150. In an illustrative embodiment, external load 150 can be an electrical grid that distributes electricity to businesses and residences. Alternatively, external load 150 can be a building, an appliance, a lighting unit, a tool, a temperature control unit, a security system, a computing unit, and/or any other consumer of electricity.

In an illustrative embodiment, the fuel cell system can be a solid oxide fuel cell system. Illustrative solid oxide fuel cell systems are described in U.S. Pat. Nos. 7,045,238 and 7,422,810, U.S. patent application Ser. No. 10/653,240 (published as U.S. Patent Application Publication No. 2005/0048334), U.S. patent application Ser. No. 10/866,238 (published as U.S. Patent Application Publication No. 2004/0224193), U.S. patent application Ser. No. 11/656,563 (published as U.S. Patent Application Publication No. 2007/0196704), and U.S. patent application Ser. No. 11/125,267 (published as U.S. Patent Application Publication No. 2006/0257696), all of which are incorporated herein by reference in their entirety. Alternatively, the fuel cell system may be a polymer electrolyte membrane (PEM) fuel cell system, a molten carbonate fuel cell system, or any other type of fuel cell system known to those of skill in the art.

In an illustrative embodiment, power control system (PCS) 100 can be configured to distribute electricity generated by fuel cell columns 110-145 between internal load 105 and external load 150 during the normal operating state. Internal load 105 can be one or more pumps, one or more blowers, one or more heaters for components such as steam generators, a power source for PCS 100, and/or any components which may be used by the fuel cell system during operation. Power control system 100 can be implemented as hardware, software, or any combination thereof. In an illustrative embodiment, power control system 100 can include a processor and a tangible computer-readable medium such as a memory, magnetic storage device, optical disk, smart card, flash memory device, etc. The tangible computer-readable medium can be configured to store computer-executable instructions that, when executed, cause PCS 100 to perform any of the fuel cell system operations described herein. Power control system 100 can also include a user input for receiving commands and/or programming instructions, an output such as a display, one or more direct current/direct (DC/DC) converters configured to increase or decrease a DC voltage of a generated DC signal, one or more direct current/alternating current (DC/AC) converters configured to convert a generated DC signal to an AC signal for an AC load, one or more routers for distributing the generated electricity, etc. An illustrative system is described in U.S. patent application Ser. No. 11/797,707 (published as U.S. Patent Application Publication No. 2008/0280175), the entire disclosure of which is incorporated herein by reference.

During the normal operating state, external load 150 can draw a significant amount of electricity from the fuel cell system. As such, all of fuel cell columns 110-145 may be generating electricity (i.e., operating in the power generation mode (also known as fuel cell mode)), and the fuel cell system may have a high temperature during the normal operating state. In the event of a load interruption, external load 150 may no longer be able to draw power from the fuel system. Such an interruption may result from a grid outage (if external load 150 is an electrical grid), a damaged transmission line between the fuel cell system and external load 150, etc. In an illustrative embodiment, if external load 150 partially or fully stops drawing electricity, PCS 100 can be configured to place at least a portion of the fuel cell system into an electrolysis or other operating mode.

Figure 2:
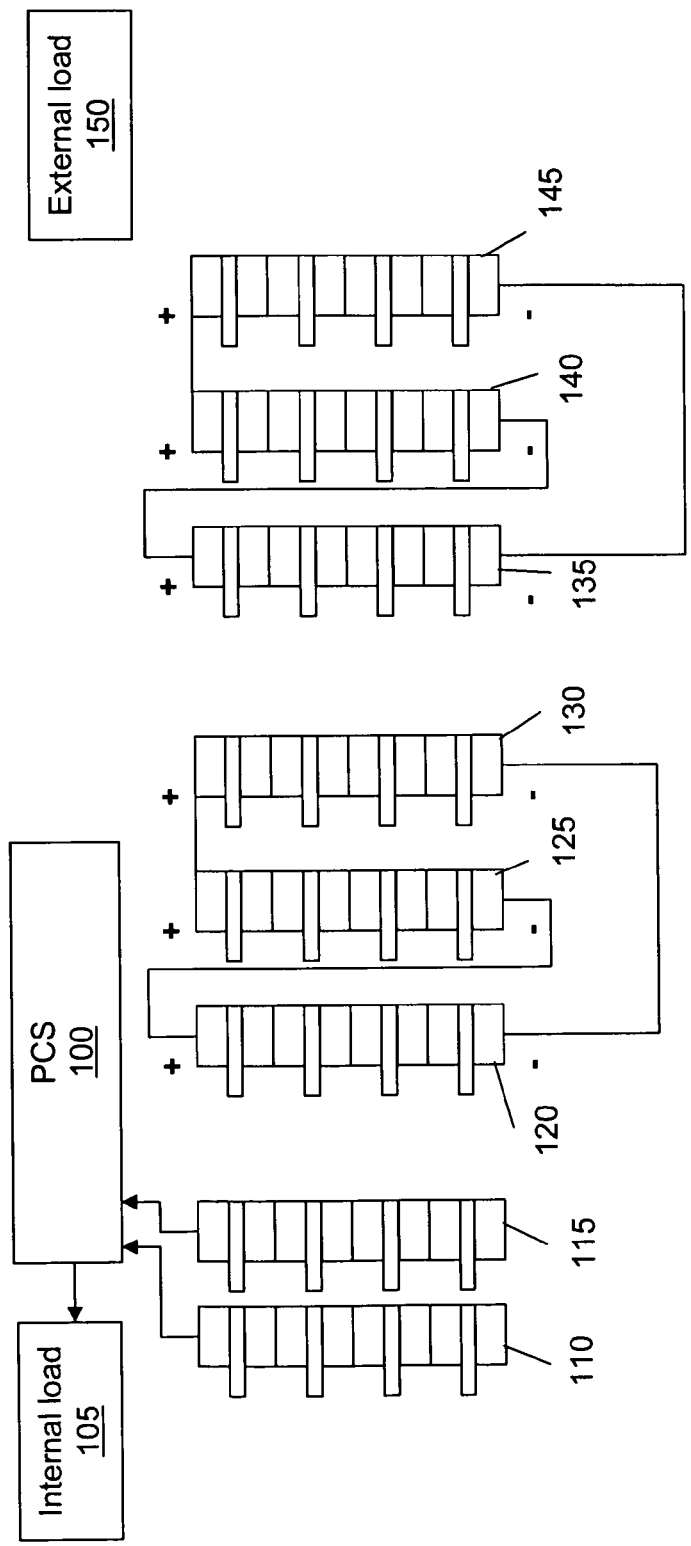
FIG. 2 is a block diagram illustrating the fuel cell system of FIG. 1 with fuel cell columns operating in an electrolysis mode in accordance with an illustrative embodiment.

FIG. 2 is a block diagram illustrating the fuel cell system of FIG. 1 with fuel cell columns operating in an electrolysis mode in accordance with an illustrative embodiment. Power control system 100 can be configured to determine an operational configuration for the fuel cell system and to place one or more fuel cell stacks or columns of the fuel cell system into the electrolysis mode or other operating mode in response to an interruption of external load 150. As illustrated in FIG. 2, fuel cell column 110 and fuel cell column 115 can be used by PCS 100 to provide electrical power to internal load 105 such that the fuel cell system remains operational. In alternative embodiments, additional or fewer fuel cell columns may used to provide the electrical power to internal load 105. Power control system 100 also causes fuel cell column 130 and fuel cell column 145 to be placed into the electrolysis mode, and causes the remaining fuel cell columns to provide power to at least fuel cell columns 130 and 145 operating in the electrolysis mode. In an illustrative embodiment, PCS 100 can also control the current of fuel cell columns 110-145 to keep the current the same on all of fuel cell columns 110-145 and to help ensure that the dissipation in all of fuel cell columns 110-145 remains approximately the same as when external load 150 is drawing power.

During the electrolysis mode, PCS 100 causes fuel cell column 120 and fuel cell column 125 to become connected in series. Fuel cell columns 120 and 125 can be connected in series using one or more switches and connectors, and/or any other methods known to those of skill in the art. As illustrated in FIG. 2, a positive output from fuel cell column 125 is connected to a positive input of fuel cell column 130, and a negative output from fuel cell column 120 is connected to a negative input of fuel cell column 130 such that fuel cell column 130 has sufficient power (provided by fuel cell columns 120 and 125) to operate in the electrolysis mode. In alternative embodiments, additional or fewer fuel cell columns may be used to provide power to a fuel cell column operating in the electrolysis mode. In the electrolysis mode, fuel cell column 130 can generate fuel for the fuel cell system. For example, in one embodiment, fuel cell column 130 can generate hydrogen ($H_2$) molecules from water or steam using electrolysis as known to those of skill in the art. Alternatively, the fuel generated for the fuel cell system can be any hydrocarbon fuel cell fuel known to those of skill in the art, and as described in U.S. Pat. No. 7,045,238.

Similarly, PCS 100 causes fuel cell column 135 and fuel cell column 140 to become connected in series using one or more switches and connectors and/or any other methods known to those of skill in the art. A positive output from fuel cell column 140 is connected to a positive input of fuel cell column 145, and a negative output from fuel cell column 135 is connected to a negative input of fuel cell column 145. As a result, fuel cell columns 135 and 140 can provide power to fuel cell column 145 such that fuel cell column 145 is placed into the electrolysis mode. In the electrolysis mode, fuel cell column 145 can generate fuel for the fuel cell system as described above with reference to fuel cell column 130.

In an illustrative embodiment, the fuel generated by fuel cell columns 130 and 145 can be used by any of fuel cell columns 110, 115, 120, 125, 135, and 140 to conserve resources during the load interruption. In one embodiment, any or all of fuel cell columns 110-145 can utilize anode exhaust gas recycling as known to those of skill in the art, and as described in U.S. patent application Ser. No. 11/491,481 filed on Jul. 24, 2006 and PCT Patent Application Publication No. WO 2007/014127, the disclosures of which are incorporated herein by reference in their entirety. As such, the fuel generated by fuel cell columns 130 and 145 operating in the electrolysis mode can be cycled into the anode inlets of any of fuel cell columns 110-145. Similarly, anode exhaust from fuel cell columns 110, 115, 120, 125, 135, and 140 operating in the normal power generation mode may contain water vapor which can be used as an input to fuel cell columns 130 and 145 operating in the electrolysis mode.

In one embodiment, fuel cell columns 110-145 can be in communication with a split (or middle) bus through one or more DC/DC converters of PCS 100. The split bus configuration can include a positive bus, a negative bus, and a neutral bus. An illustrative split bus configuration is described in more detail in U.S. patent application Ser. No. 12/149,488 titled Uninterruptible Fuel Cell System and filed on May 2, 2008, the disclosure of which is incorporated herein by reference in its entirety. In an illustrative embodiment, the split bus can be configured to provide a voltage of 400 volts (V). Alternatively, any other voltage value may be provided. In another alternative embodiment, a single bus or any other bus configuration may be used. The one or more DC/DC converters can be used to control (i.e., boost and/or buck) the voltage and/or current output from fuel cell columns 110-145 during the normal power generation operating mode.

In one embodiment in which DC/DC converters are used, unidirectional DC/DC converters can be used to connect the fuel cell columns designated to remain in the normal power generation operating mode to the split (or other) bus configuration. Also, one or more bi-directional DC/DC converters can be used to connect the fuel cell column(s) designated to enter the electrolysis mode to the split (or other) bus configuration. In such an embodiment, the bi-directional DC/DC converter(s) can be used to provide DC power to the split bus during the normal operating mode and to receive electrical power from the split bus during the electrolysis mode. The unidirectional DC/DC converters can be used to provide DC power to the split bus during both the normal operating mode and the electrolysis mode. In addition to providing/receiving DC power, the bi-directional DC/DC converter(s) can also be used to match the voltage and control the current of the one or more fuel cell columns in the electrolysis mode. The use of bi-directional DC/DC converters to draw power from the split bus can also eliminate additional switches and/or contactors which may be utilized to place fuel cell columns into the electrolysis mode. In one embodiment, all of the DC/DC converters used can be bi-directional such that any of fuel cell columns 110-145 can be placed into the electrolysis mode.

As an example, fuel cell columns 140 and 145 may be designated to go into the electrolysis mode in the event of an interruption of external load 150. Fuel cell columns 110, 115, 120, 125, 130, and 135 can be connected to the split bus using one or more unidirectional DC/DC converters, and fuel cell columns 140 and 145 can be connected to the split bus using one or more bi-directional DC/DC converters. Alternatively, all of the DC/DC converters may be bi-directional. During the normal power generation operating mode, all of fuel cell columns 110-145 can provide DC power to the split bus through their respective DC/DC converters for eventual distribution to internal load 105 and external load 150. During the electrolysis mode, fuel cell columns 110, 115, 120, 125, 130, and 135 can continue to provide DC power to the split bus through the one or more unidirectional DC/DC converters. In the electrolysis mode, the split bus can be used to provide power to internal load 105, and to fuel cell columns 140 and 145 through the one or more bi-directional DC/DC converters. In one embodiment, in the electrolysis mode, fuel cell columns 140 and 145 may be connected in series, and a single bi-directional DC/DC converter can be used to provide power to fuel cell columns 140 and 145. Alternatively, each of fuel cell column 140 and fuel cell column 145 can have a distinct bi-directional DC/DC converter.

In an embodiment in which one or more bi-directional DC/DC converters are used to connect the fuel cell columns designated for electrolysis mode to the split bus, power control system (PCS) 100 can utilize any number of fuel cell columns to drive a given fuel cell column in the electrolysis mode. For example, PCS 100 can use 1, 2, 3, 4, 5, 6, etc. fuel cell columns to drive a single electrolysis fuel cell column. Controlling the number of fuel cell columns which drive an electrolysis fuel cell column can be important in a solid oxide fuel cell system because operation of the electrolysis fuel cell column may be highly endothermic. As a result, the electrolysis fuel cell column may have a significantly higher current density as compared to the fuel cell columns in the normal power generation operating mode which are to be driven to exothermic voltage levels. Such a configuration provides continued generation of heat in the event of a load interruption, and allows matching of the heat generated within each fuel cell column.

In one embodiment, any or all of fuel cell columns 110-145 may have two anode feeds. The first anode feed can be for standard fuel such as hydrogen or a hydro-carbon fuel such as natural gas. The second anode feed can be for steam. In an illustrative embodiment, PCS 100 can cause a fuel cell column in the electrolysis mode to utilize the steam anode feed, and the standard fuel anode feed can be isolated. Provision of steam to the anode feed can help prevent reformation on the individual fuel cells. Provision of steam to the anode feed can also be used to prevent large doses of un-reacted gases (i.e., $H_2$, methane, etc.) from being passed to one or more anode tail gas oxidizers (ATO) of the fuel cell system. As a result of the provision of steam, the fuel cell column(s) in the electrolysis mode can have a substantially higher steam concentration being provided to their anode inlets than the fuel cell columns in the normal power generation operating mode.

In one embodiment, the steam to be provided to the fuel cell column(s) in electrolysis can be generated using a standard fuel cell steam generator that is used during normal operation. In such an embodiment, PCS 100 can utilize one or more steam valves to select between sending steam to fuel cell columns in the normal power generation operating mode and fuel cell columns in the electrolysis mode. The one or more steam valves can be standard, readily available steam valves known to those of skill in the art. Alternatively, the one or more steam valves may be manually controlled by an operator of the fuel cell system. In another alternative embodiment, a separate steam generator may be used to generate steam for the fuel cell column(s) operating in the electrolysis mode. In one embodiment, the water concentration of fuel cell columns 110-145 may also be increased through the use of additional anode exhaust recycle or by utilizing a water pump of the fuel cell system to pump more water.

In an illustrative embodiment, PCS 100 can also place one or more fuel cell columns into the electrolysis mode in the event that the fuel cell system has to roll over to stored liquid fuels such as propane, ethanol, diesel, etc. One event which may necessitate such a roll over is an interruption of an external fuel source such as a natural gas (or other) pipeline used to provide the fuel cell system with fuel. In such an embodiment, stored fuel from a vessel can be provided to the fuel cell column(s) operating in the normal power generation operating mode such that the fuel cell column(s) operating in the normal operating mode can provide power to internal load 105 and to the fuel cell column(s) operating in the electrolysis mode. Also, steam can be provided to the fuel cell column(s) operating in the electrolysis mode as described above. In one embodiment, the anode exhaust of fuel cell columns 110-145 may be combined. As such, a percentage of the hydrogen or other fuel produced by the fuel cell columns in the electrolysis mode may be re-circulated to the fuel cell columns in the normal operating mode. The percentage of fuel re-circulated can be approximately 60-65%, or any other value depending on the fuel cell system.

As a result of the recirculation of the fuel produced by the fuel cell columns in the electrolysis mode, the fuel cell columns operating in the normal power generation mode (to drive the electrolysis fuel cell columns) can have an increased hydrogen concentration. The increased hydrogen concentration can help mitigate the risk of coking that may result from the use of the stored liquid fuel. Further, PCS 100 can control the number of fuel cell columns in the electrolysis mode to help ensure that enough hydrogen is generated to prevent coking in the fuel cell columns operating in the normal power generation operating mode.

In one embodiment, PCS 100 can be configured to place one or more of the fuel cell columns into an oxygen ($O_2$) pumping mode and/or into a virtual hydrogen ($H_2$) pumping mode in the event of a load or other interruption at the fuel cell system. In such an embodiment, one or more fuel cell columns can remain in the normal power generation operating mode to drive the one or more fuel cell columns designated for pumping. The process and configuration used for placing fuel cell columns into the pumping mode can be the same as or different from those described above with reference to placing fuel cell columns into the electrolysis mode.

Oxygen pumping is a fundamental capability of the solid oxide electrolyte of the solid oxide fuel cells. In the oxygen pumping mode, air (or other oxidizer, such as pure oxygen) continues to flow to the cathode (i.e., into the cathode chambers) of the solid oxide fuel cells of a fuel cell column. The fuel cell cathode can be referred to as an oxygen pump anode in the oxygen pumping mode. The fuel flow to the fuel cell anode (which can be referred to as an oxygen pump cathode in the oxygen pumping mode) is stopped (e.g., by closing a valve in the fuel inlet conduit). The current is forced to flow through each cell in the column in the same direction as with the fuel cell mode from an external power source (i.e., other fuel cell column(s)) except that the cell polarity is reversed. Oxygen diffuses from the fuel cell cathode through the solid oxide electrolyte to the fuel cell anode and the generated oxygen gas is then separately vented from the fuel cell anodes or recycled to the fuel cell cathodes. For cells that operate in the oxygen pumping mode, the fuel cell anode catalyst should be selected to tolerate the evolving oxygen gas during the reversal.

The "virtual" hydrogen pumping mode involves converting the fuel cell cathode into a water electrolysis anode. In this mode, the air supply to the fuel cell cathode is stopped (e.g., by turning off the air blower and/or by shutting off a valve in the air inlet conduit) and water vapor is introduced to the fuel cell cathode (e.g., from a steam generator) in place of air. An external power source (e.g., other fuel cell columns) drive the current in the same direction as in the fuel cell mode which results in a reversed polarity. The fuel cell anode (which can be referred to as a water electrolysis cathode in the hydrogen pumping mode) continues to receive fuel flow to depolarize the electrolysis cathode (i.e., the fuel cell anode) to a lower positive voltage relative to the electrolysis anode (i.e., the fuel cell cathode). The fuel cell cathode (which can be referred to as the electrolysis anode in the hydrogen pumping mode) consumes water vapor and evolves hydrogen gas (the oxygen from the water vapor diffuses through the solid oxide electrolyte to the fuel cell anode). The fuel cell anode (i.e., the electrolysis cathode) consumes fuel (such as hydrogen and carbon monoxide) and produces water vapor and $CO_2$. The hydrogen gas evolved from the fuel cell cathode (i.e., the electrolysis anode) may be recycled to the fuel inlet of all or some of the solid oxide cells. The fuel cell cathode electrode should be selected to tolerate the evolving hydrogen gas for fuel cells which operate in the hydrogen pumping mode.

In one embodiment, either or both of the pumping modes can be used as an alternative to the electrolysis mode to keep the fuel cell system operational in the event of an interruption. Alternatively, either or both of the pumping modes may be used in conjunction with the electrolysis mode.

The oxygen pumping mode and/or the virtual hydrogen pumping mode (which may result in a higher voltage) can be used to increase current density in the fuel cell column(s) to help make up for a low pumping potential drop which may occur due to the high performance of the electrolyte. In an embodiment in which oxygen pumping is used, the pumped oxygen can be used by fuel cell columns operating in the normal power generation operating mode. As a result, a cathode blower used to provide oxygen to the fuel cell system can be disabled or turned down to conserve resources and reduce the draw of internal load 105. Further, the fuel cell columns that are pumping oxygen may generate heat based on the $I^2R$ heating (i.e., current squared times internal resistance) which occurs while pumping the oxygen. This heat can be used to help maintain the operating temperature of the fuel cell system and prevent damage thereto.

In an embodiment in which virtual hydrogen pumping is used, $H_2$ can be pumped from the anode to the cathode of fuel cells in the virtual hydrogen pumping mode. The pumped $H_2$ can also be mixed with a large volume of cathode air coming from the fuel cell columns in the normal power generation operating mode. In a hot box design in which a tail gas combustor is located proximate to the fuel cell columns, combustion which may occur due to the mixing of exhaust from the fuel cell columns in the normal operating mode and the fuel cell column(s) in the pumping mode would not be a problem.

Figure 3:
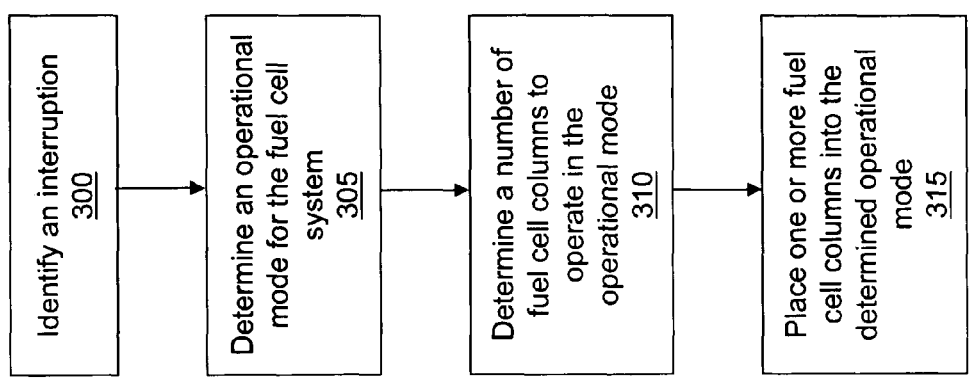
FIG. 3 is a flow diagram illustrating operations performed by a power control system of a fuel cell system with interruption control in accordance with an illustrative embodiment.

FIG. 3 is a flow diagram illustrating operations performed by a power control system of a fuel cell system with interruption control in accordance with an illustrative embodiment. In alternative embodiments, additional, fewer, and/or different operations may be performed. Further, the use of a flow diagram is not meant to be limiting with respect to the order of operations performed. In an operation 300, the power control system identifies an interruption at the fuel cell system. In an illustrative embodiment, the interruption can be an external load interruption such that the external load is no longer able to draw electrical power from the fuel cell system. The load interruption can be identified when the external load ceases to draw electrical power from the fuel cell system. Alternatively, the interruption may be an interruption of a natural gas or other supply line to the fuel cell system.

In an operation 305, the power control system determines an operational mode for the fuel cell system. In one embodiment, the operational mode, which can be part of an operational configuration of the fuel cell system, may be determined based at least in part on the type of interruption identified in operation 300. The determination of the operational mode can also be based on an actual or desired temperature of the fuel cell system, an amount of fuel available to the fuel cell system, and/or any other desired or actual operating characteristics of the fuel cell system. In an illustrative embodiment, the operational mode can be an electrolysis mode in which one or more fuel cell columns is configured to generate fuel for the fuel cell system. Alternatively, or in addition to the electrolysis mode, the operational mode may also be an oxygen $O_2$ pumping mode and/or a virtual hydrogen $H_2$ pumping mode. In an alternative embodiment, the power control system may automatically utilize the electrolysis mode.

In an operation 310, the power control system determines a number of fuel cell columns to operate in the determined operational mode. The number of fuel cell columns designated to enter the determined operational mode, which can be part of the operational configuration of the fuel cell system, can be based on a size of the fuel cell system, a desired or actual temperature of the fuel cell system, the type of interruption, a voltage of the fuel cell system, a current of the fuel cell system, the likelihood of coking, the likelihood of reformation, an amount of power drawn by an internal load of the fuel cell system, and/or any other characteristics of the fuel cell system. For example, in the event of an external load interruption, the power control system may determine that the placement of two of eight fuel cell columns into the electrolysis mode is sufficient to conserve resources while maintaining the operating temperature of the fuel cell system. Similarly, if the fuel cell system has been rolled over to a stored liquid fuel, the power control system may determine that 3 of 8 fuel cell columns should be placed into the electrolysis mode to prevent coking. Alternatively, any other numbers of fuel cell columns may be used. In an alternative embodiment, the number of fuel cell columns to enter the determined operational mode may be predetermined based on the configuration of the fuel cell system.

The operational configuration of the fuel cell system in the event of an interruption can also include a number of fuel cell columns which are to remain in the normal power generation operating mode, a number of fuel cell systems which are to provide power to an internal load, an amount of power to be provided to the internal load, a desired operating temperature of the fuel cell system, whether to provide steam to fuel cell columns of the fuel cell system, an amount of steam to provide to the fuel cell columns of the fuel cell system, a type of fuel to be generated during electrolysis, an amount of oxygen and/or hydrogen to be pumped in the pumping modes, an amount to reduce cathode blower draw during the pumping modes, etc. In an illustrative embodiment, the power control system can automatically determine the operational configuration during the interruption based on desired or actual operating characteristics of the fuel cell system, the likelihood that coking will occur, the likelihood that reformation will occur, etc.

In an operation 315, the power control system places the determined number of fuel cell columns into the determined operational mode. In an illustrative embodiment, one or more of the fuel columns can be connected to a split bus through one or more bi-directional DC/DC converters. As such, fuel cell columns to be placed in the electrolysis or pumping mode can draw power from the split bus through the one or more bi-directional DC/DC converters. In such an embodiment, an internal load of the fuel cell system can also draw power from the split bus. Alternatively, the fuel cell system may be configured with switches and connectors such that the fuel cell columns to be placed in the electrolysis or pumping mode receive power directly from one more fuel columns operating in the normal operating mode. In such an embodiment, the power control system can determine a number of fuel cell columns which are to provide power to the internal load of the fuel cell system.

In one embodiment, the power control system can also determine whether to provide steam to the fuel cell column(s) in the determined operational mode and/or how much steam to provide to the fuel cell column(s) in the determined operational mode. The determination of whether and/or how much steam to provide can be based on the likelihood of reformation on the individual fuel cells and the likelihood that large doses of un-reacted gas may be passed to the anode tail gas oxidizer (ATO). In one embodiment, the fuel cells have a second feed dedicated for the receipt of steam from the steam generator of the fuel cell system.

The foregoing description of exemplary embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A method for operating a fuel cell system during an interruption, comprising:
   identifying a load interruption in which an external load is partially or fully unable to draw electrical power from at least a first fuel cell column and at least a second fuel cell column of the operating fuel cell system, wherein the first fuel cell column and the second fuel cell column are operating in a normal power generation operating mode providing power to the external load prior to the identified load interruption;
   operating the first fuel cell column of the operating fuel cell system in an electrolysis mode such that the first fuel cell column generates fuel during the identified load interruption; and
   providing power to the first fuel cell column operating in the electrolysis mode from the second fuel cell column of the operating fuel cell system during the identified load interruption, wherein the second fuel cell column continues operating in the normal power generation operating mode during the identified load interruption.

2. The method of claim 1, further comprising determining an operational configuration for the operating fuel cell system such that the operating fuel cell system maintains an operating temperature during the identified load interruption.

3. The method of claim 2, wherein determining the operational configuration includes determining a number of fuel cell columns that are to operate in the normal power generation operating mode during the identified load interruption.

4. The method of claim 2, wherein determining the operational configuration includes determining a number of fuel cell columns that are to be operated in the electrolysis mode.

5. The method of claim 4, wherein the number of fuel cell columns that are to be operated in the electrolysis mode is determined based at least in part on a likelihood that coking will occur in the operating fuel cell system.

6. The method of claim 2, wherein the operational configuration includes a predetermined amount of steam to provide to the first fuel cell column.

7. The method of claim 1, further comprising placing at least a third fuel cell column of the operating fuel cell system into a pumping mode during the identified load interruption.

8. The method of claim 7, wherein the pumping mode comprises an oxygen pumping mode.

9. The method of claim 7, wherein the pumping mode comprises a virtual hydrogen pumping mode.

10. The method of claim 1, further comprising providing steam to the first fuel cell column through an anode feed of the first fuel cell column when the first fuel cell column operates in the electrolysis mode.

11. The method of claim 10, further comprising providing the steam without providing hydrogen or hydrocarbon fuel to the first fuel cell column when the first fuel cell column operates in the electrolysis mode.

12. The method of claim 10, further comprising providing at least one of the hydrogen or the hydrocarbon fuel to the first fuel cell column when the first fuel cell column operates in the normal power generation mode.

13. The method of claim 1, further comprising using anode exhaust recycling to provide at least a portion of the fuel generated by the first fuel cell column to the second fuel cell column.

14. The method of claim 1, wherein the power from the second fuel cell column is provided to the first fuel cell column through a split bus by way of a bi-directional DC/DC converter in electrical communication with the first fuel cell column and with the split bus.

15. The method of claim 14, further comprising using the bi-directional DC/DC converter to control a voltage or a current of the first fuel cell column.

16. The method of claim 14, further comprising:
   determining that the external load is no longer experiencing the identified load interruption; and
   in response to determining that the external load is no longer experiencing the identified load interruption, operating the first fuel cell column of the operating fuel cell system in the normal power generation operating mode such that the first fuel cell provides power to the split bus by way of the bi-directional DC/DC converter.

17. The method of claim 1, wherein the second fuel cell column provides the power to a split bus by way of a unidirectional DC/DC converter in electrical communication with the second fuel cell column and the split bus.

18. The method of claim 1, wherein operating the first fuel cell column in the electrolysis mode includes directly connecting an electrical output of the first fuel cell column to the second fuel cell column.

19. The method of claim 1, further comprising providing power to an internal load of the operating fuel cell system from at least a third fuel cell column of the operating fuel cell system during the identified load interruption, wherein the third fuel cell column is operating in the normal power generation operating mode.

20. The method of claim 1, further comprising matching heat generated by a plurality of fuel cell columns of the operating fuel cell system such that a temperature of the plurality of fuel cell columns is substantially constant.

21. A non-transitory computer-readable medium having computer-executable instructions stored thereon which, upon execution, cause a power control system of an operating fuel cell system to:
   identify a load interruption in which an external load is partially or fully unable to draw electrical power from at least a first fuel cell column and at least a second fuel cell column of the operating fuel cell system, wherein the first fuel cell column and the second fuel cell column are operating in a normal power generation operating mode providing power to the external load prior to the identified load interruption;
   operate the first fuel cell column of the operating fuel cell system in an electrolysis mode such that the first fuel cell column generates fuel during the identified load interruption; and
   provide power to the first fuel cell column operating in the electrolysis mode from at least a second fuel cell column of the operating fuel cell system during the identified load interruption, wherein the second fuel cell column continues operating in the normal power generation operating mode during the identified load interruption.

22. The method of claim 1, wherein power provided to all fuel cell columns of the operating fuel cell system operating in the electrolysis mode during the identified load interruption is provided only from fuel cell columns of the operating fuel cell system operating in the normal power generation operating mode.

23. The method of claim 1, wherein all fuel cell columns in the operating fuel cell system generate electricity for distribution to the external load when the external load is fully able to draw electrical power from the operating fuel cell system.

24. The method of claim 1, wherein identifying a load interruption in which an external load is partially or fully unable to draw electrical power from the operating fuel cell system comprises identifying the load interruption in which the external load is partially or fully unable to continue drawing electrical power from the operating fuel cell system.

* * * * *